United States Patent
Salmi et al.

(10) Patent No.: US 8,285,874 B2
(45) Date of Patent: Oct. 9, 2012

(54) ROUTING SYSTEMS AND METHODS FOR IMPLEMENTING ROUTING POLICY WITH REDUCED CONFIGURATION AND NEW CONFIGURATION CAPABILITIES

(75) Inventors: Robert James Salmi, Minnetonka, MN (US); Michael Robert Rowlee, St. Paul, MN (US); Thomas P. Barron, Minneapolis, MN (US); Stuart Stanley, Eden Prairie, MN (US); Haldane Roy Peterson, Bloomington, MN (US); David Delano Ward, Somerset, WI (US); David Iver Bergum, Minneapolis, MN (US)

(73) Assignee: Cisco Technology, Inc., San Jose, CA (US)

( * ) Notice: Subject to any disclaimer, the term of this patent is extended or adjusted under 35 U.S.C. 154(b) by 1840 days.

(21) Appl. No.: 10/765,756

(22) Filed: Jan. 27, 2004

(65) Prior Publication Data
US 2005/0198382 A1    Sep. 8, 2005

(51) Int. Cl.
*G06F 15/16* (2006.01)
(52) U.S. Cl. ........................ 709/245; 709/240; 379/219
(58) Field of Classification Search .................. 709/240, 709/245; 379/219
See application file for complete search history.

(56) References Cited

U.S. PATENT DOCUMENTS

| | | | |
|---|---|---|---|
| 6,466,984 B1 * | 10/2002 | Naveh et al. | 709/228 |
| 6,829,347 B1 | 12/2004 | Odiaka | |
| 6,839,350 B1 | 1/2005 | Inouchi et al. | |
| 7,020,718 B2 * | 3/2006 | Brawn et al. | 709/238 |
| 7,818,780 B1 | 10/2010 | Salmi et al. | |
| 2002/0141343 A1 | 10/2002 | Bays | |

(Continued)

FOREIGN PATENT DOCUMENTS
WO  WO-2005/072344 A2   8/2005
(Continued)

OTHER PUBLICATIONS

"International Search Report for corresponding PCT Application No. PCT/US05/02369", (Apr. 19, 2007),3 pgs.

(Continued)

*Primary Examiner* — Thomas Dailey
(74) *Attorney, Agent, or Firm* — Schwegman, Lundberg & Woessner, P.A.

(57) ABSTRACT

In some embodiments, a method and routing system parameterize a routing policy and apply the parameterized-routing policy to a route. Parameters are assigned to at least some policy statements of the policy. The parameterized policy may be called with parameters stored in a parameter table. In some embodiments, common blocks of the policy may be identified and assigned parameter sets. A commonized routing policy may be reused within more than one policy.

In some embodiments, a method and routing system may evaluate a configuration file to determine relationships between route attributes. The relationships may be expressed in one or more mathematical functions, and when a route is received from a peer, the attributes of the route may be modified based on the mathematical functions.

In some embodiments, a router and method for implementing routing policy and traffic engineering are provided. Routing policy may be implemented by performing a policy translation on a policy configuration to generate an internal-policy representation. Attribute-operator pairings of the internal-policy representation may be verified with one or more client dynamic load libraries (DLLs). When the attribute-operator pairings have been verified, the internal-policy representation may be compiled and stored in a system database. A client protocol may be notified that the routing policy has been modified.

37 Claims, 6 Drawing Sheets

U.S. PATENT DOCUMENTS

| | | |
|---|---|---|
| 2002/0141378 A1 | 10/2002 | Bays et al. |
| 2002/0199016 A1* | 12/2002 | Freedman .................... 709/241 |
| 2003/0204619 A1 | 10/2003 | Bays |
| 2004/0039942 A1 | 2/2004 | Cooper et al. |
| 2004/0088431 A1* | 5/2004 | Carter ......................... 709/240 |
| 2004/0199664 A1* | 10/2004 | Feldman et al. ............. 709/238 |
| 2004/0230681 A1 | 11/2004 | Strassner et al. |

FOREIGN PATENT DOCUMENTS

| | | |
|---|---|---|
| WO | WO-2005072344 A3 | 8/2005 |

OTHER PUBLICATIONS

"Written Opinion of the International Searching Authority for corresponding PCT Application No. PCT/US05/02369", (Attorney Docket No. 1370.065W01), (Apr. 19, 2007), 3 pgs.

"U.S. Appl. No. 10/816,138, Notice of Allowance mailed May 28, 2010", 6 pgs.

* cited by examiner

[POLICY PARAMETERIZATION]

[APLLICATION OF PARAMETERIZED POLICY]

ROUTING SYSTEMS AND METHODS FOR IMPLEMENTING ROUTING POLICY WITH REDUCED CONFIGURATION AND NEW CONFIGURATION CAPABILITIES

TECHNICAL FIELD

Embodiments of the present invention pertain to routers and routing systems, and in particular, to routing policy and routing-policy configuration.

BACKGROUND

Routing systems use configuration files and routing policy to make decisions regarding routes. Configuration files are used to apply policy to routes which may be received as new routes or as part of route-update messages. Conventional configuration files are growing very large and very complex with the advent of larger and more sophisticated routing systems. Conventional configurations may take many lines of configuration to effect a desired result. One problem with these large configuration files is that the need to vary a single value in the configuration may require a whole block of lines to be repeated many times in the configuration file. This makes for extremely large amounts of configuration that are replicated, maintained, stored, and processed. These large configuration files must also be understood by the device and the user. Thus there are general needs for improving router-policy configuration. There are also needs for reducing the amount of configuration. There are also needs for reducing the amount of configuration for specific routing policies, especially when only a few values are varied within the configuration.

There are times when a user or operator may wish to evaluate additional information on a running network. One problem with conventional routing systems is that conventional systems inhibit direct access to information outside of the route attributes. This makes it difficult for a user or system administrator to create routing policies, for example, that take into account traffic statistics on a running network when altering route attributes. Thus, there are needs for systems and methods that may allow a user or system administrator to incorporate additional non-route attribute information, such as traffic statistics, into a running network. There are also general needs for routing systems and methods that may implement routing policy using non-route attribute data such as traffic engineering information.

SUMMARY

In some embodiments, parameterization is applied to routing policy and routing-policy configuration. In these embodiments, routing-policy language for a router includes two major constructs to a configuration, which may significantly reduce the amount of configuration required to specify routing policy. The first construct provides a basic modularity such that common blocks of policy may be specified once and reused. In some embodiments, hierarchical reuse may be used where a policy may reuse and/or make reference to one or more common policy blocks. More than one level of hierarchy may also be permitted. The second construct may allow common blocks of policy to be parameterized. Parameterization allows policies that share similar structure and may reference different values within that structure to be defined, stored and maintained once. Each variant or invocation of a parameterized policy may maintain appropriate parameters for a variant rather storing and maintaining a full copy of each variant of the policy.

In some embodiments, a method and routing system may evaluate a configuration file to determine relationships between route attributes. The relationships may be expressed in one or more mathematical functions. When a route is received from a peer, the attributes of the route may be modified based on the mathematical functions.

In some embodiments, a router and method for implementing routing policy using traffic engineering information are provided. In one embodiment, a method for implementing routing policy includes performing a translation of a policy configuration to generate an internal-policy representation. In the policy statement 'set med 10', set is the operator and need is the attribute. Attribute-operator pairings of the internal-policy representation may be verified with one or more client dynamic load libraries (DLLs). When the attribute-operator pairings are verified, the internal-policy representation may be compiled and stored in a system database. A client protocol may be notified that the routing policy has been modified.

In some embodiments, routing policy may be implemented using sets and set operators. In these embodiments, a method of generating routing policy may comprise decoupling data items from actions associated with the data items, and building a routing policy by combining common components using set operations on the data items and the actions. In these embodiments, common data items that span across more than one domain may be reused for the more than one domain. In these embodiments, the data items may comprise prefixes, as-path expressions and community lists, for example. In these embodiments, the actions may comprise at least accept and deny actions. In these embodiments, a routing system may comprise a plurality of route or packet filters that share common data items for reuse across more than one domain. One or more processing elements may decouple data items from actions associated with the data items and may build a routing policy by combining common components using set operations on the data items and the actions.

In some embodiments, customers may control how policy statement operation are applied to in a policy. In these embodiments, a method of generating routing policy is provided which may comprise prefixing statements of a single routing policy with either source or sink designations. The method may also comprise applying statements with the source designations to match operations, and applying statements with the sink designations to set operations. In these embodiments, a routing system is also provided which may comprise a single routing policy comprising statements prefixed with either source or sink designations, and processing elements to apply the statements with the source designations to match operations, and to apply the statements with the sink designations to set operations.

In some embodiments, routing policy diagnostics are provided with the addition of an extension to policy language to allow generic signaling using event triggers, which may be user defined. In these embodiments, event triggers may be applied to routes received by routing system.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims.

Figure 1:
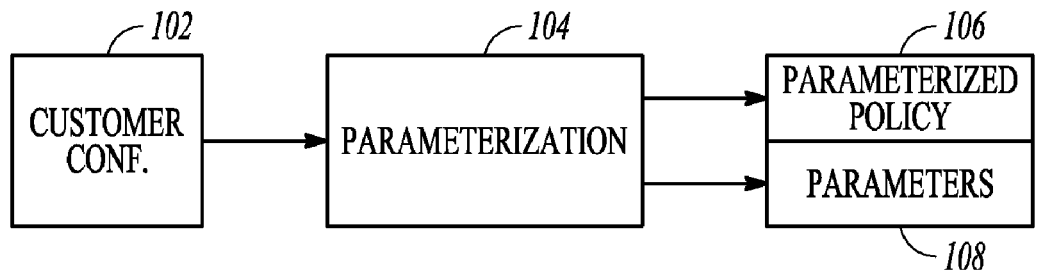
FIG. 1 illustrates policy parameterization in accordance with some embodiments of the present invention.

FIG. 1 illustrates policy parameterization in accordance with some embodiments of the present invention. A customer configuration, such as customer configuration 102, may comprise one or more routing policies. Each routing policy may comprise one or more policy statements. Examples of policy statements for a particular customer may include setting a community tag attribute or a multi-exit discriminator (MED) attribute to a particular value. Parameterization 104 may be performed on the policy statements to generate parameterized policy 106. A parameterized policy may comprise one or more parameterized-policy statements. In some embodiments, a parameterized policy may also include some policy statements that have not been parameterized. Each parameterized-policy statement may have a set of parameters 108 associated with a particular policy statement and/or customer's configuration. The parameters may be stored in a parameter table, although the scope of the invention is not limited in this respect. Other ways of associating parameters with customer configurations may also be used.

In some embodiments, common blocks of policy statements may be identified and may be used across different customer configurations. These common blocks of policy statements may include parameterized-policy statements as well as policy statements that are not parameterized. Accordingly, common blocks may be reused within a routing policy, as well as across different policies.

Figure 2:
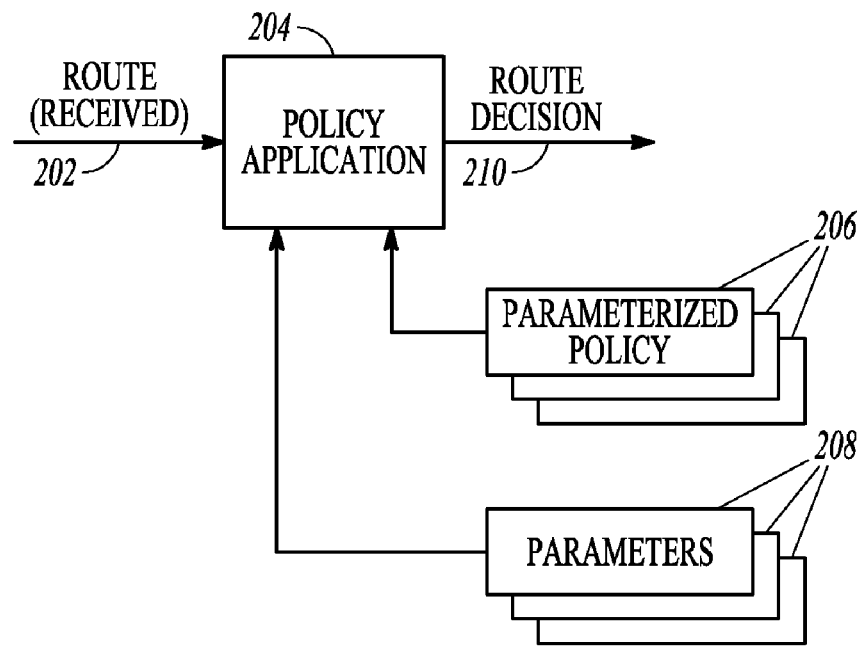
FIG. 2 illustrates the application of a parameterized policy in accordance with some embodiments of the present invention.

FIG. 2 illustrates the application of a parameterized policy in accordance with some embodiments of the present invention. In some embodiments, a parameterized policy may be applied when a route, such as route 202, is received as part of a route-update message from another routing system. During policy application 204, one of parameterized policies 206 may be called with one of the sets of parameters 208 based on the customer or customer class. Route decision 210 may comprise determining whether to accept the route, whether to modify attributes of the route, or whether to send the route or the modified route to peer routing systems. When the route is accepted or modified, the accepted or the modified route may be installed on the router. When the route is modified, an attribute of the route may be changed, a new attribute may be created, or an attribute may be deleted, for example.

In accordance with some embodiments of the present invention, a parameterized-policy statement may utilize one or more parameters, and a parameterized-routing policy may include parameterized-policy statements as well as non-parameterized-policy statements. More than one parameterized-routing policy may be generated and be operated concurrently for a customer configuration. Furthermore, parameterized-routing policies may be used across different customer configurations. In some embodiments, parameterized routing polices may be used within other parameterized-routing policies.

In accordance with some embodiments of the present invention, one or more common blocks of policy statements may be identified. The common blocks may be common to more than one routing policy. A commonized routing policy may be generated from the one or more common blocks, and the commonized routing policy may be reused by calling the commonized routing policy from within the more than one routing policy which uses the common blocks. The commonized routing policy may include both parameterized-policy statements as well as policy statements that are not parameterized. In some embodiments, parameters may be assigned to at least some of the policy statements of the common blocks to parameterize some policy statements in the common blocks. When generating a commonized routing policy, a call to the one or more common blocks may be placed in the routing policy.

Conventionally policy configurations may take many additional lines of configuration to affect a desired result. One problem with these conventional configurations is that the need to vary only one value in the many lines of configuration means that a whole block of the additional lines is repeated in the configuration for a new customer policy. This makes for large amounts of configuration that must be maintained, stored, processed and understood by the device and the user. In accordance with the embodiments illustrated in FIGS. 1 and 2, parameterization and hierarchy are applied to routing policy and routing-policy configuration. In these embodiments, routing policy language for a router may include two major constructs to a configuration, which may help significantly reduce the amount of configuration to specify routing policy. Hierarchy provides a basic modularity so that common blocks of policy may be specified once and reused. Parameterization allows for specialized reuse of these common blocks. Further savings may result because reused blocks of configuration that may share the same structure but may reference different values within that common structure may not necessarily need to be repeated.

Adding parameterization and hierarchy may allow a user to define a policy configuration once and may allow the creation of as many variants as desired by referencing a common block with the appropriate parameters allowing a user to define many functions.

The following is an example of applying parameterization and hierarchy to routing policy and routing-policy configuration. In a new policy language, a simple parameterized policy, called "param_example", may be defined which uses a local-preference and a community tag as parameters. Three policies (e.g., example_1, example_2, and example_3) may then be built off this parameterized policy as illustrated below.

```
prefix-set rfc-1918
    10.0.0.0/8 ge 8 le 32,
    192.168.0.0/16 ge 16 le 32,
    0.0.0.0
end-set
route-policy param_example ( $pref, $comm-tag)
    if (destination in RFC-1918) then
        drop
    else
        set origin igp
        set community (10:20, 10:30, 10:$comm-tag)
        set local-preference $lpref
    endif
end-policy
route-policy example_1
    apply param_example (100,100)
    pass
end-policy
route-policy example_2
    apply param_example (200,200)
    pass
end-policy
route-policy example_3
    apply param_example (300,300)
    pass
end-policy
```

If these same three policies were implemented using a conventional policy mapping approach (e.g., IOS route-maps), the configuration may be expressed as follows:

```
ip prefix-list RFC-1918
    10 deny 10.0.0.0/8 ge 8 le 32
    20 deny 192.168.0.0/16 ge 16 le 32
    30 deny 0.0.0.0
exit
route-map example_1 permit 10
    match ip address prefix-list RFC-1918
exit
route-map example_1 permit 20
    set tag 40
    set origin igp
    set local-preference 100
    set community 10:20 10:30 10:100
exit
route-map example_2 permit 10
    match ip address prefix-list RFC-1918
exit
route-map example_2 permit 20
    set tag 40
    set origin igp
    set local-preference 200
    set community 10:20 10:30 10:200
exit
route-map example_3 permit 10
    match ip address prefix-list RFC-1918
exit
route-map example_3 permit 20
    set tag 40
    set origin igp
    set local-preference 300
    set community 10:20 10:30 10:300
exit
```

Note that in the route-map example, the complete body of the policy is repeated for each example. The differences are the two lines that set the local preference and the community value, but all other lines are repeated. Consider the situation in which the user then desires to change the tag value to 560. It must be modified in all 3 locations in the route-map example. Extrapolating this to a scale of several hundred or thousand policies, this becomes a significant item to maintain, store and comprehend. In accordance with some embodiments of the present invention, the language needs to be changed only in a common parameterized policy (e.g., param_example). Thus, the use of parameterized policies may significantly reduce the size of policies in these situations.

Accordingly, the time to process a configuration and the requirements both on and off box required to store a configuration may be significantly reduced. This modularization and reuse may further reduce the maintenance requirements for a customer because one copy of a common block of configuration, for example, may be used rather than several copies spread all over their configuration space. Furthermore, large reductions in configuration may allow a user to have a clearer understanding of what a router is configured to do. Network outages due to missing portions of repeated configuration when changes are made may be reduced. In addition, network outages due to an incorrect understanding of the configuration may be reduced as the intent of the configuration becomes clearer.

Figure 3:
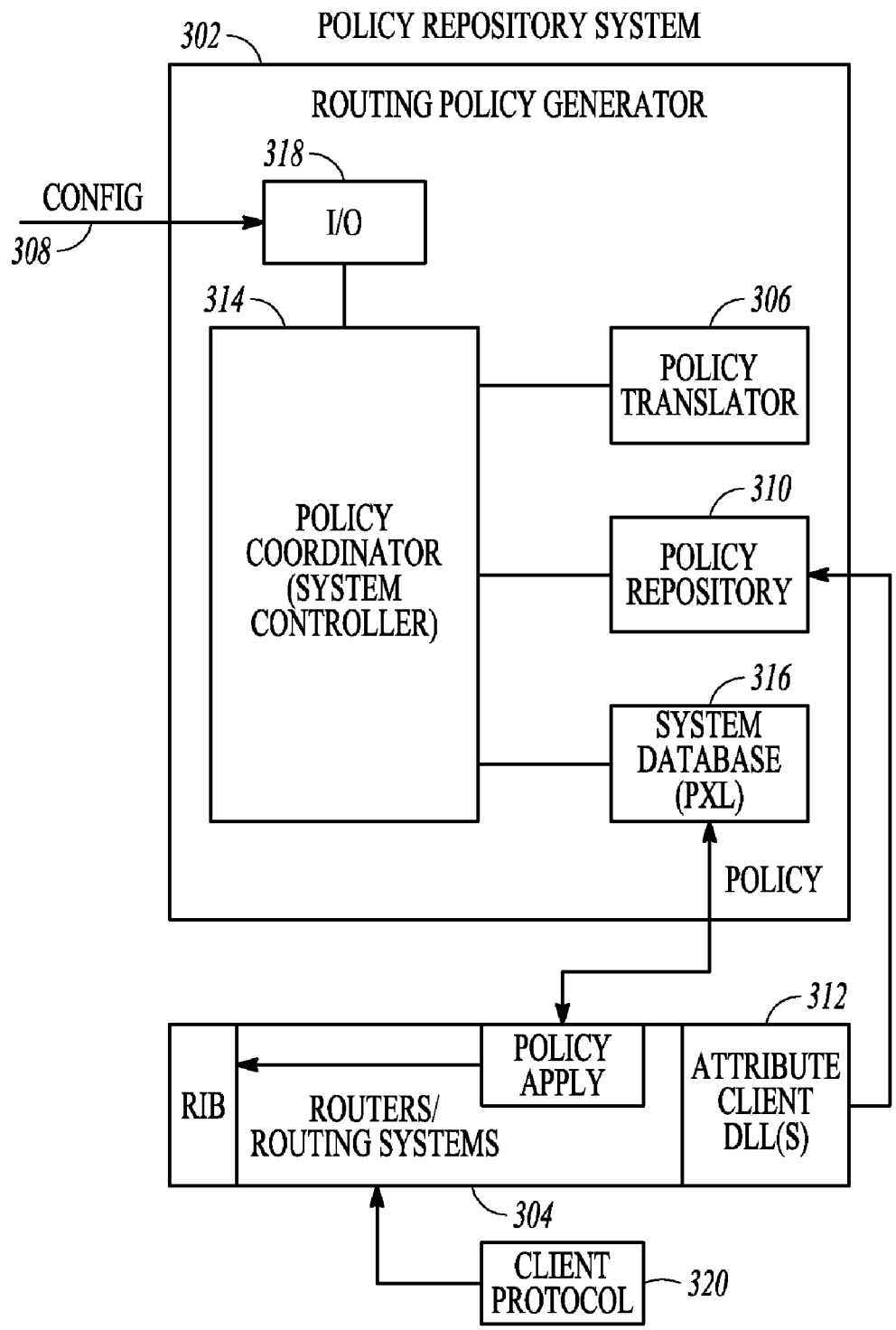
FIG. 3 is a functional block diagram of a policy repository system and router in accordance with some embodiments of the present invention.

FIG. 3 is a functional block diagram representing the policy repository system and router in accordance with some embodiments of the present invention. Policy repository system 302 may be used for generating routing policy and may comprise policy translator 306 which may perform a translation of policy configuration 308 to generate an internal-policy representation. The internal-policy representation may be generated for one or more policy statements comprising policy configuration 308. In some embodiments, policy translator 306 may perform a lexical analysis on a policy configuration to generate an internal-policy representation.

Policy repository system 302 may also comprise policy repository 310 which may verify attribute-operator pairings of the internal-policy representation with one or more client dynamic load libraries (DLLs) 312. Policy repository 310 may compile the internal-policy representation when the attribute-operator pairings are verified. Policy repository system 302 may also include system database 316 to store one or more complied internal-policy representations. Policy repository system 302 may also include policy coordinator or controller 314 which may notify a client protocol that a complied routing policy has been modified. In some embodiments, policy repository system 302 may also include I/O device 318 to receive the policy configuration, which may be in the form of one or more policy statements. I/O device 318 may receive the policy configuration entered by a user or operator in the form of one or more policy statements. In some embodiments, the policy statements may be in a grammatical form (e.g., having a specific grammar). Router or routing system 304 may apply the routing policy to a route received from client protocol 320, such as the border-gateway protocol (BGP).

Policy repository 310 may verify each of several attribute-operator pairings of the internal-policy representation with the client DLLs. The client DLLs may include verification routines for the attributes and associated operators to allow the policy repository to query each attribute-operator pairing and pass arguments present in the configuration to each statement in the policy. Policy repository 310, as part of compiling, may generate the compiled internal-policy representation in a policy transmission language (PXL), although the scope of the invention is not limited in this respect.

Although system 302 and device 304 are illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer readable memory that may be volatile or non-volatile memory or a combination thereof.

Figure 4:
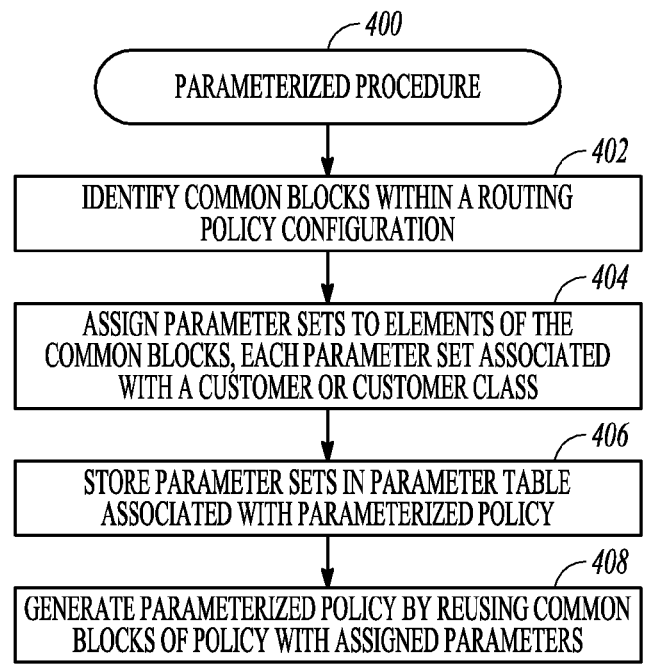
FIG. 4 is a flow-chart of a parameterizing procedure in accordance with some embodiments of the present invention.

FIG. 4 is a flow chart of a parameterizing procedure in accordance with some embodiments of the present invention. Procedure 400 may be performed by a processing system, such as system 302 (FIG. 3) although the scope of the invention is not limited in this respect. In operation 402, common blocks of policy statements may be identified in a routing-policy configuration. The routing-policy configuration may be for a particular customer or a particular customer's configuration. In some embodiments, a customer configuration may comprise more than one policy. In these embodiments, operation 402 may comprise identifying common blocks of policy statements in each of the various policies, as well as identifying common blocks of policy statements across the different polices of the customer configuration.

In operation 404, parameters may be assigned to common policy statements of the routing-policy configuration. In some embodiments, sets of parameters may be assigned to common blocks of policy statements.

In operation 406, the parameters may be stored in a parameter table associated with the parameterized policy and customer configuration. Accordingly, a parameterized policy may be called with parameters from the parameter table, and may be based on the customer configuration.

In operation 408, the parameterized policy may be generated by reusing the common blocks of policy with the assigned parameters. The reuse of common blocks of policy in a parameterized policy may significantly reduce the size of a customer configuration resulting in a much more manageable system, especially for very large configurations.

Figure 5:
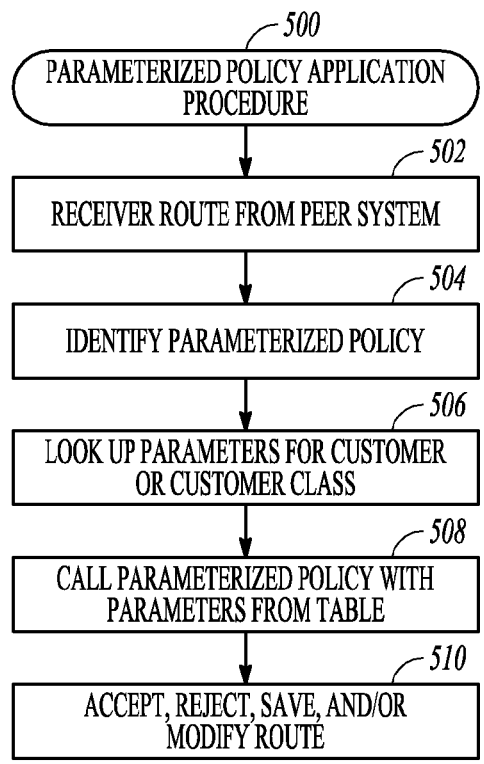
FIG. 5 is a flow chart of a parameterized-policy application procedure in accordance with some embodiments of the present invention.

FIG. 5 is a flow chart of a parameterized policy application procedure in accordance with some embodiments of the present invention. Parameterized policy application procedure 500 may be performed by a system, such as system 302 (FIG. 3) although other systems may also perform procedure 500. In some embodiments, a parameterized policy may include both parameterized and non-parameterized policy statements.

In operation 502, a route may be received from a peer system. The route may be received as part of a route-update message, although this is not a requirement.

In operation 504, a policy associated with the route may be identified. The policy may be a parameterized policy or a non-parameterized policy. In some embodiments, the associated policy may be identified from information in the route. When the identified policy is a parameterized policy, operation 506 and 508 may be performed. In operation 506, the parameters for the identified policy may be looked up (e.g., in a parameter table) depending on, for example, the customer or customer class.

In operation 508, the policy may be called with the parameters from the table, and in operation 510, the policy may be applied to the received route. Operation 510 may include accepting, rejecting or modifying the route, as well as saving the accepted or modified route.

Figure 6:
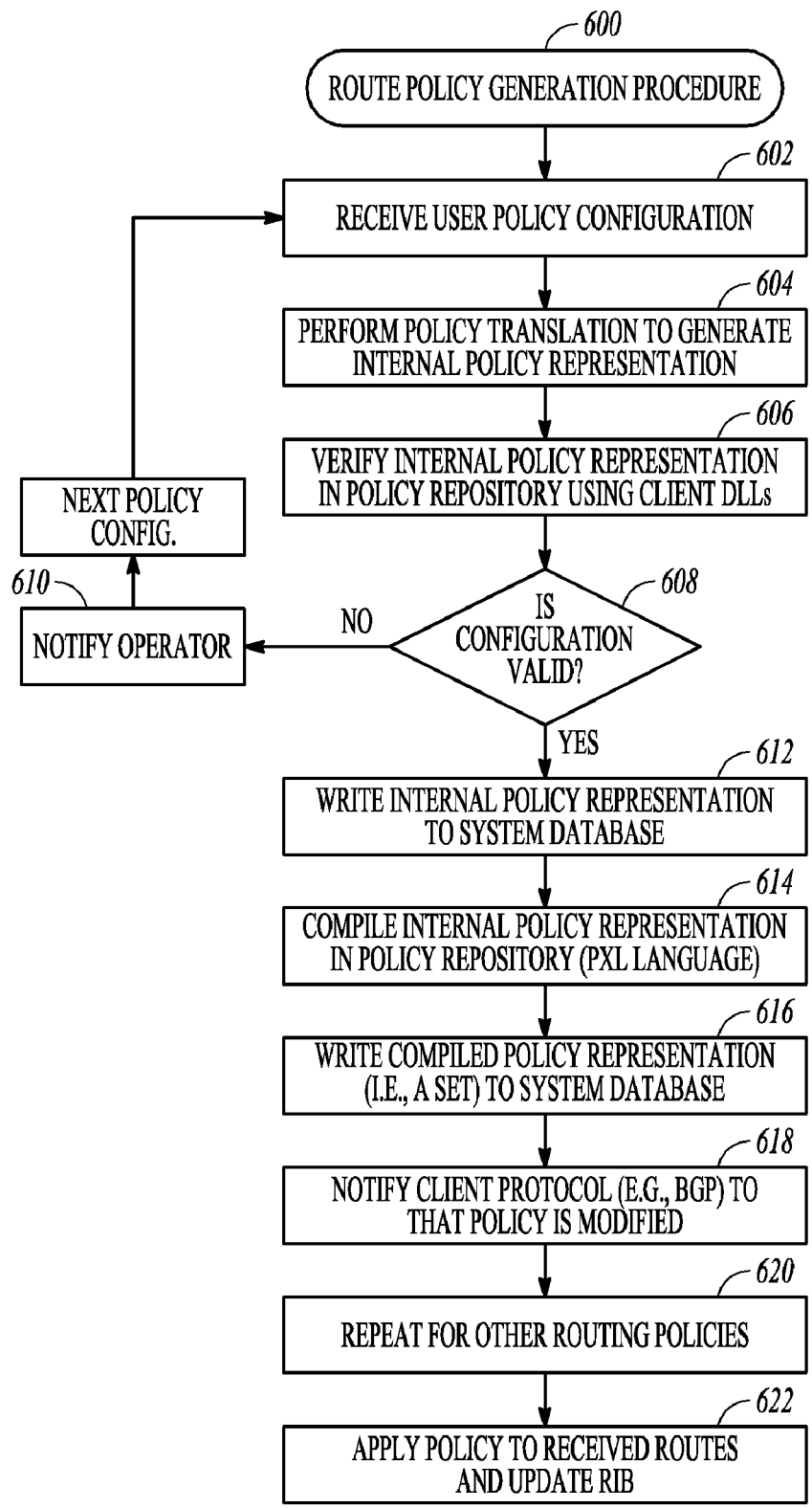
FIG. 6 is a flow chart of a route-policy-generation procedure in accordance with some embodiments of the present invention.

FIG. 6 is a flow chart of a route policy generation procedure in accordance with some embodiments of the present invention. Procedure 600 may be performed by a system, such as system 302 (FIG. 3) although other systems may also be suitable. In embodiments, procedure 600 may be performed on a continual or substantially continual basis to generate and apply policy to routes.

In operation 602, a policy configuration is received in the form of one or more policy statements. In some embodiments, the policy configuration may be entered by a user or operator in the form of one or more policy statements. In some embodiments, the policy statements may be in grammatical form. In some embodiments, a lexical analysis may be performed on a policy configuration to generate an internal-policy representation.

In operation 604, a policy translation may be performed on the policy configuration to generate an internal-policy representation. The internal-policy representation may provide pairings between attributes and operators and the arguments associated with those pairings. In some embodiments, a route-policy configuration may be defined by lexical, grammatical and semantic rules, which may be used to build the internal representation that provides the pairings between attributes and operators.

In operation 606, attribute-operator pairings of the internal-policy representation may be verified with one or more client dynamic load libraries (DLLs). In some embodiments, operation 606 may include verifying each of a plurality of attribute-operator pairings of the internal-policy representation with the client DLLs. The client DLLs may include verification routines for the attributes and associated operators to allow a policy repository to query each attribute-operator pairing and may pass arguments present in the configuration to each statement in the policy.

Operation 608 determines whether or not the attribute-operator pairings have been verified. When any one of the pairings cannot be verified, the policy configuration may be invalid and a system administrator or user may be notified in operation 610. Procedure 600 may be performed for other policy configurations. When operation 608 determines that all the pairings can be verified, operation 612 may be performed.

In operation 612, the internal-policy representation may be stored to allow interrogation by the user. In operation 614, the internal-policy representation is compiled. In operation 616, the complied policy representation is stored in a system database. In some embodiments, the compiled internal-policy representation may be generated and stored in a policy transmission language (PXL).

In operation 618, a client protocol, such as BGP, is notified that the routing policy has changed so that the protocol can take appropriate measures when the policy is in use. When the policy is just being created, the new policy may now be available for use by the protocol.

In operation 620, portions of procedure 600 may be repeated for other policy configurations. Operation 620 is an optional operation and nothing requires it be performed in the sequence illustrated.

In operation 622, the routing policy may be applied to a route received from the client protocol (e.g., as part of a BGP route-update message). In some embodiments, a RIB entry may also be updated.

Although the individual operations of procedure 600 are illustrated and described as separate operations, one or more of the individual operations may be performed concurrently and nothing requires that the operations be performed in the order illustrated.

Figure 7:
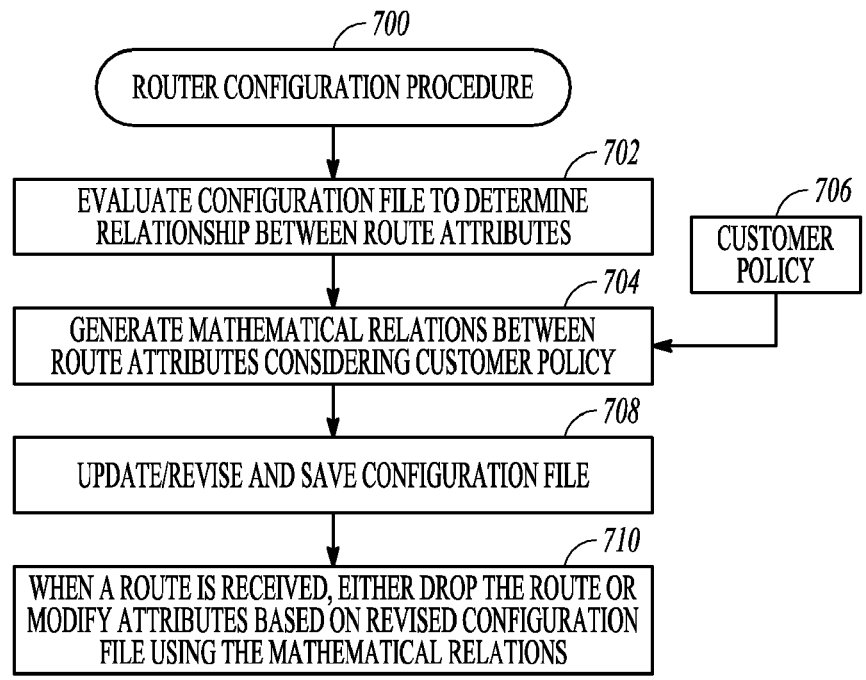
FIG. 7 is a flow chart of a router-configuration procedure which applies mathematical operations to route attributes in accordance with some embodiments of the present invention.

FIG. 7 is a flow chart of a router-configuration procedure which applies mathematical operations to route attributes in accordance with some embodiments of the present invention. Procedure 700 may be performed by a routing system, and some embodiments, may be performed by system 302 (FIG. 3), although other systems may also be suitable. Conventional approaches to assigning route attributes generally use simple match and assign operations. Often these are used to express relationships between different values. For example a local-preference may be assigned based on a MED value or a community tag value. Direct mappings between these attribute spaces are quite commonly used by service providers. One problem with conventional approaches to assigning route attributes is that there may be no or limited ability to express the relationships between different route values, and thus, the user may be forced to enumerate all the possible cases in a configuration.

In accordance with some embodiments of the present invention, mathematical operations are applied to routing policy. In operation 702, a configuration file may be evaluated to determine relationships between route attributes. Operation 704 may generate one or more mathematical functions based on the relationships between route attributes determined in operation 702. Operation 704 may further consider customer policy 706 in generating the mathematical functions. In some embodiments, customer policy 706 may be a parameterized policy as discussed above.

In operation 708, the configuration file may be updated, revised and saved, although this is not a requirement. When a route is received (e.g., from a peer), operation 710 may comprise modifying one or more of the attributes of the received route based on the mathematical functions generated in operation 706.

In some embodiments, operation 708 may comprise generating a revised configuration file which expresses the relationships between the route attributes with the one or more mathematical functions, and operation 710 may comprise modifying the attributes of the received route using the revised configuration file.

In some embodiments, a received packet may be routed using the received route with the modified attributes. In some embodiments, the one or more mathematical functions comprises at least one of: adding an offset to a value of a first attribute for a determined value of a second attribute; and multiplying the value of the first attribute by a factor for the determined value of the second attribute. The first and second attributes can comprise, but are not limited to, a community tag attribute, a local preference attribute, and/or a multi-exit discriminator (MED) attribute. They may also comprise any other route attribute or portion of a route attribute.

In some embodiments, the values of variable transformations in operation 704 may be expressed as one or more logical mathematical functions. For example, the local-preference attribute may be set to the lower 16 bits of a community tag +10 or to the value of the MED attribute. In these embodiments, the capabilities to retrieve these attribute values and build mathematical expressions using these values allows a user or operator to set the values of other attributes. For example, a percent sign may be used to indicate that the value of a retrieved route attribute is being operated on.

An example of building expressions follows:
set community 1234: (% med+10)

This may set the lower 16 bits of the community to the value of the med in the route if any+10.

In another example:

```
if (community in allowed_communities) then
    set local-preference %matched_community & 0x0000ffff +
    10
endif
```

This may set the local-preference to "the lower 16 bits of the matched community value+10" for any routes that had communities in the list of allowed communities.

Setting attribute values using mathematical expressions may allow a greater range of values to be used without having to enumerate all the possible cases in the configuration. This permits a finer granularity of attribute manipulation without having to increase configuration storage space. In addition, when a translation of attribute values is desired, having the translation expression present in the configuration makes this fact much more obvious to the user. The mapping information about how to set local-preferences or community values, for example, may be referenced directly in the configuration rather than having to refer to separately maintained documentation. This may make the intent of policy clearer to the user attempting to understand it.

Figure 8:
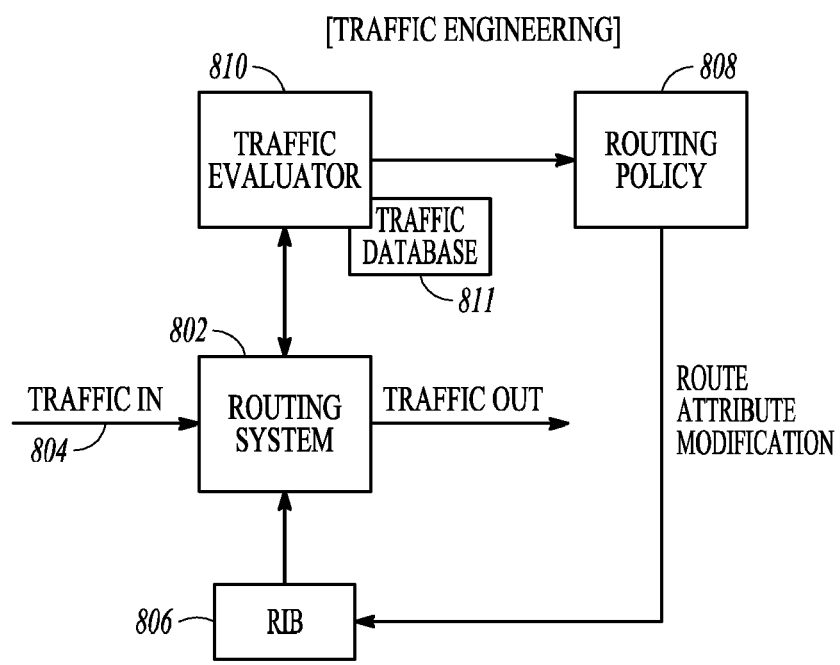
FIG. 8 illustrates the use of traffic engineering in routing policy in accordance with some embodiments of the present invention.

FIG. 8 illustrates the use of incorporating traffic engineering information in routing policy in accordance with some embodiments of the present invention. In these embodiments, an operator or user may incorporate additional information, such as traffic statistics, when altering route attributes. One problem with conventional routing systems is that conventional systems may not allow direct access to information outside of the route attributes proper. In accordance with these embodiments, routing system 802 may route traffic 804 based on routing information, which may be stored in a database such as routing information base (RIB) 806. RIB 806 may have been generated from the application of routing policy 808 in accordance with many techniques, including those previously discussed. Traffic evaluator 810 may evaluate traffic 804 to generate information, such as traffic statistics, for particular routes. This information may be stored in traffic database 811. This information may be used to by routing policy 808 to alter route attributes for eventual inclusion in RIB 806. These embodiments of the present invention provide direct access to information outside of the route attributes proper. In accordance with these embodiments, the architecture of a policy infrastructure may be sufficiently extensible to allow traffic information to be considered when performing routing policy transformations. Route attributes may be set and/or modified based on traffic engineering information generated from routing system 802.

For example, traffic evaluator 810 may learn that some routes utilize a congested link, and may tag these routes or may have their preferences set so that the congested links are used when alternatives links are not available. In these embodiments, any characteristic which may be measured and compared against by traffic evaluator 810 may be used to alter route attributes. For example, such characteristics may include static characteristics such as the bandwidth of a link, or more dynamic characteristics such as the number of dropped or discarded packets on an interface, as well as the available bandwidth on an interface. In some cases, the state of protocols may be checked and/or changed based on this information.

Figure 9:
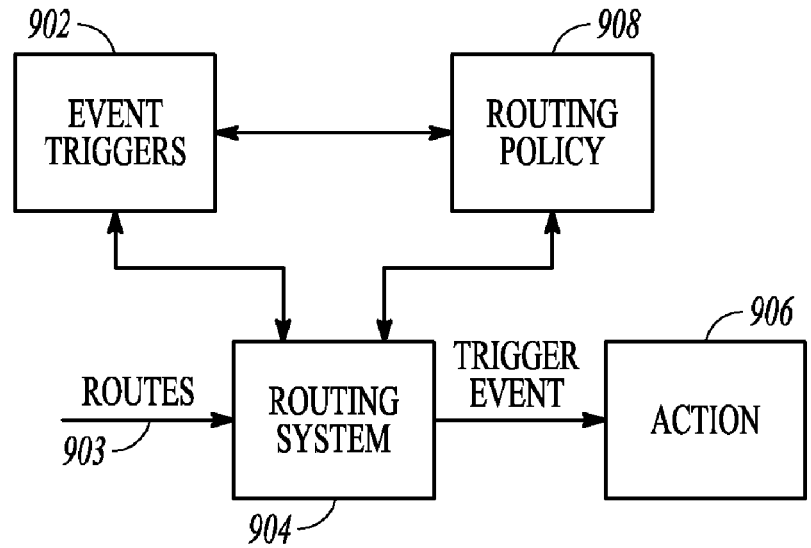
FIG. 9 illustrates the use of event triggers in accordance with some embodiments of the present invention.

FIG. 9 illustrates the use of event triggers in accordance with some embodiments of the present invention. In these embodiments, routing policy diagnostics are provided with the addition of an extension to policy language to allow generic signaling using event triggers, which may be user defined. In these embodiments, event triggers 902 may be applied to routes 903 received by routing system 904. The application of event triggers 902 may result in a triggered event which may result in one or more actions 906. Actions 906 may include, for example, logging the event, modifying a route attribute based on the event, taking down a peer from which the route was received, and/or changing the system configuration based on the triggered event. In some embodiments, actions 906 may include actions not directly related to a route or route attribute. In some embodiments, routing-protocol diagnostics are provided for routing policy 908. These embodiments allow for a greater understanding of the router and network state, and may provide mechanisms which allow for trapping and responding to errors when under stress as well as for dealing with abnormal events. In one example, the number of routes received from a specific peer may be limited. In another example, specific blocks of address space on a peer may be filtered. These embodiments may allow other events in the network to be able to be tracked by event triggers 902.

In these embodiments, an extension to the policy language may be added that allows the user to define triggers in a general manner. This may be used anywhere in the policy where any action may be taken. These triggers may be then turned into various types of events such as system-log messages, as well as any other events that the user may monitor remotely using conventional mechanisms. Event triggers 902 may also be used to affect changes in application state. For example, actions 906 may comprise actions such as sending a notification message, taking a peer down, modifying dampening parameters or changing a max-prefix limit, for example.

These embodiments may help users detect events on networks, and may allow users to create events that they wish to monitor. For example, there is often boilerplate policy that is put into place to protect the network, such as filtering of RFC-1918 address space or default routes. In addition to the normal drop, modify, and accept notions of policy, any or all of these protection mechanisms may be used by event triggers 902 to create events that may be monitored. In some embodiments, this may occur directly as a policy executes and may allow for earlier detection of some class of "abnormal" events.

In some embodiments, event triggers 902 may be used to identify and track protocol specific events. For example, a BGP notice may be sent to bring down a peer that is misbehaving, or the dampening parameters on a peer that is flapping routes may be aggressively increased. In some embodiments, event triggers 902 may be 'a part of' or may be 'checked' by routing policy 908.

Figure 10:
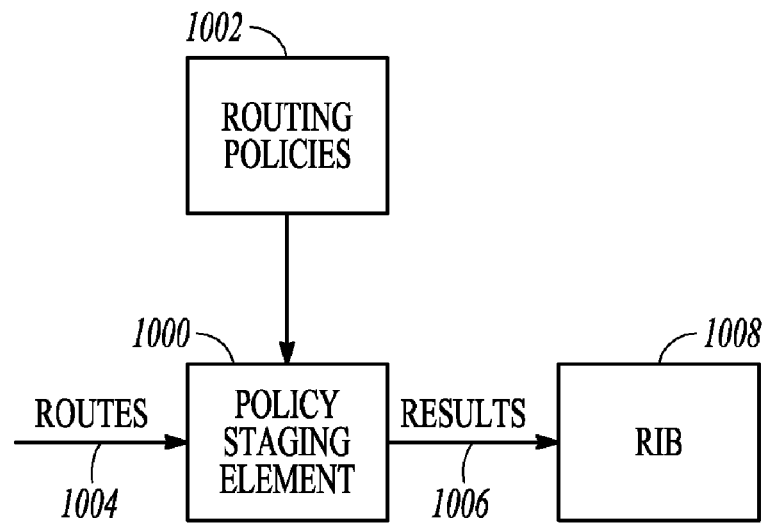
FIG. 10 illustrates policy staging in accordance with some embodiments of the present invention.

FIG. 10 illustrates policy staging in accordance with some embodiments of the present invention. In accordance with these embodiments, policy staging may allow a comparison between policies at a single attach point, and may be performed before a policy is implemented. Conventionally, it has not been possible to determine the effects that a new policy may have on a route or set of routes in a network until after the policy has actually been applied. The statements in a policy may have a profound effect not just on routers within a network, but may also have profound effects on external networks. The application of routing policy controls the distribution and acceptance of routes between routing protocols and between neighboring routers.

In these embodiments, policy staging may also provide the ability to tell that the policies are different and where they are different. In these embodiments, policy staging may also tell what the result for a particular prefix would be for both policies. For example, policy staging element 1000 may apply two or more policies from routing policies 1002 to a received route 1004. Routing policies 1002 may include existing routing policies as well as staged-routing policies. Results 1006 may be provided for each of the policies. In these embodiments, policy staging element 1000 may also pass results 1006 of a staged policy to routing information base (RIB) 1008, and may determine how the results would change the RIB. The routes may be specially marked so as to not influence the current routing information allowing a user the ability to do a comparison, or to determine how the forwarding table of RIB 1008 would table would change with the application of the new (e.g., staged) policy.

Accordingly, policies may be tested and evaluated for different scenarios before they are applied to an attach point. In this way, the user may know before hand exactly what impact a new policy will have on a peer, and how it will affect the RIB and thus forwarding. This ability may help prevent network outages by preventing a disruptive change from being applied in the first place.

In some embodiments, policies, such as "my policy" and "stage-1", may be compared by prepending a value in the as-path for matched routes of one policy, and prepending another value in the as-path for matched routes of the other policy. An operation may be defined to identify to a user that the policies are different and neither is dropped. Routes that have been updated and/or dropped with policy "stage-1" may be specifically marked so that these changes do not affect the current running system, but yet are stored in the RIB. Accordingly, what is currently in the RIB may be compared by applying policy "stage-1".

In accordance with some embodiments of the present invention, set operations may be performed on source route information, and match operations may be performed on sink or result information as it is being constructed. In these embodiments, both of these approaches may be combined in one policy. Accordingly, customers and/or users may control the application of policy statements to routing policy and routing-policy configuration.

In these embodiments, the current capabilities of the routing policy language may be enhanced to give the network engineer the ability to specify, for each statement in a policy, that the statement should perform its operation on source or sink data. The user may prefix each operation with one of the following designations: "source" or "sink". By default, the "source" designation may be applied to match operations, and the "sink" designation may be applied to set operations to follow the approach that currently dominates the market place and to reduce the complexity of the configuration. Consider the following example which sets the MED for destinations in the set "FOO" and then later does a comparison on the MED value that may or may not have been previously altered.

```
route-policy test_med
    if (destination in FOO) then
        set med igp-cost
    endif
    .....
    if (sink.med gt 20000) then
        drop
    endif
end-policy
```

These embodiments may help expand the scope and capabilities of the current approaches of applying policy to routing, and thus may offer network engineers the ability to write policies that were never before possible. Furthermore, this embodiment may allow for new flexibility in the policies that users write. In these embodiments, concepts such as "if this policy has not already prepended an as-path then take actions x y and z" may be expressed, for example. By providing this new functionality, network engineers may be able to tune their networks in ways never before possible.

In some embodiments, routing policy may use sets to decouple data from actions allowing the reuse of data. Conventional configuration of routing policy uses data containers that associate groups of data directly with actions. The actions may be directly coupled with the data. Conventionally, this is done with a list of data such as prefixes, as-path regular expressions, community-lists etc and an entry signifying a notion of accept or deny. In conventional systems, directly coupling this data with accept and deny actions presents several problems. For example, data that may be common to more than one domain generally may not be reused across the domains. Consider the case of packet filtering and route filtering by prefix. The prefix data may overlap in both the route filters and the packet filters, but because actions are directly associated with the data and packet filtering usually requires looking at additional fields of data (e.g., src port) in the packet that are not present in the route updates and vice versa, any common prefix data may not be shared across the two domains. For example in an IOS configuration, a route-filter that may look like this:

ip prefix-list example
10 deny 10.0.0.0/8 ge 8 1e 32
20 deny 192.168.0.0/16 ge 16 1e 32
30 permit 222.222.222.0/24
40 permit 222.222.111.0/24
50 permit 222.111.222.0/24
60 permit 222.111.111.0/24
70 permit 222.110.222.0/24
80 permit 222.110.111.0/24
90 permit 222.101.222.0/24
100 permit 222.101.111.0/24
A packet filter may look like this:
ip access-list extended example_extended
10 deny ip any 10.0.0.0 255.0.0.0
20 deny ip any 192.168.0.0 255.255.0.0
30 permit tcp any 222.222.222.0/24 established
40 permit tcp any 222.222.111.0/24 established
50 permit tcp any 222.111.222.0/24 established
60 permit tcp any 222.111.111.0/24 established
70 permit tcp any 222.110.222.0/24 established
80 permit tcp any 222.110.111.0/24 established
90 permit tcp any 222.101.222.0/24 established
100 permit tcp any 222.101.111.0/24 established Note that identical prefix data for all of the lines is repeated in both the packet and the route filter. Since the configuration specification requires the associated actions and different fields be specified in the list, the common prefix data is repeated in each list. Associating actions directly with the data makes combining this data together difficult. When a user or operator may wish to negate the result of a comparison and combine it with another, it becomes semantically difficult to understand the intent. A user or operator might wish to define a policy which says, "If route X is in list A, but not in list B then set the local-preference to 100". However this may be difficult to do as the semantics of negating the match of an ACL, which contains both permit and deny statements may not be clear. Hence coupling the actions directly with the data may tend to force a user or operator to use single long lists rather than allowing the user or operator to combine together common components.

In accordance with embodiments of the present invention, the notion of sets and independent operations on sets of data in configuring policy are used. A set may be a collection of data elements. In these embodiments, the notion of acceptance or denial directly is decoupled from the data. This decoupling of the data containers from actions on the data allows policies to be constructed in many more unique ways than conventional mechanisms provide. Finally, the introduction of sets allows data to be combined together using conventional set operations like union and intersection etc.

Embodiments of the present invention which decouple the data from actions have several advantages. First, since actions are decoupled, data that span different domains may be reused without having to maintain multiple copies of the configuration data. Thus when defining route and packet filters that share the same prefix data, the prefix data may be specified once and reused across the two domains. This may lead to more efficient configuration and less maintenance of that data for the user. Secondly, building complex comparisons becomes semantically tractable. For example, on a peering router, a user or operator may wish to have a policy that says only accept a specific set of routes from peer A and never send them to peer B. If this is done with conventional prefix-based mechanisms, then two lists must be maintained. One list is the inverse of the other. By decoupling the actions and storing the prefixes as a set, this becomes much simpler. The set may be defined once and Boolean tests for membership in the set may be used to affect the policies for peers A and B. These tests of set membership may be combined together using Boolean operators "and", "or" and "not", to build more advanced comparisons. Consider defining a policy which explicitly drops all routes in a particular address space, all routes that are very specific such as/32 host routes, and any routes from network blocks that one owns. Finally, accept any routes that are expected from autonomous system (AS) number 1234. This might be a typical filter a user or operator may wish to install on a peering connection with AS 1234. Building a Boolean expression on various sets, the user may express that policy as follows:

```
if (((destination in RFC-1918) or
    (destination in my_prefixes) or
    (destination in too_specific))
    and (not destination in allowed_routes_from_as_1234)) then
        drop
else
    set local-preference 100
endif
```

Writing a policy in this manner makes the intent of the policy much clearer than in conventional systems. Providing Boolean operators to combine the corresponding lists that currently exist in many configuration languages becomes intractable very quickly because of the embedding of the actions of permit and deny within the list structures themselves. Using Boolean operators to combine operations allows the user to be explicit, while still having mechanisms that are understandable and scalable. Finally, since these sets are simply collections of common data, it would also become possible to build together larger sets out of a smaller set by using set union and intersection operators. This may also reduce configuration requirements.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, and others.

It is emphasized that the Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features that are expressly recited in each claim. Rather, as the following claims reflect, inventive subject matter lies in less than all features of a single disclosed embodiment. Thus the following claims are hereby incorporated into the detailed description, with each claim standing on its own as a separate preferred embodiment.

What is claimed is:

1. A computer-implemented method comprising:
    using a data processor to parameterize a routing policy, wherein the parameterizing includes identifying one or more common blocks of policy statements within the routing policy, at least one policy statement in the common blocks of policy statements being an attribute-operator pairing, wherein the operator is a set operator for setting the attribute to a particular value, the common blocks of policy statements sharing a similar structure, assigning sets of parameters to elements of the one or more common blocks, at least one common block being re-used with a different assigned set of parameters, and enabling a hierarchical arrangement of the one or more common blocks of policy statements within the routing policy;
    compiling the parameterized routing policy; and
    applying the parameterized routing policy to a route.

2. The method of claim 1 wherein the routing policy includes a plurality of policy statements, and wherein parameterizing includes assigning parameters to at least some of the policy statements and refraining from assigning parameters to at least some other of the policy statements to generate the parameterized routing policy.

3. The method of claim 1 wherein parameterizing includes:
    for the routing policy, generating at least one parameterized-policy statement having an associated set of parameters for one of either a customer or customer class.

4. The method of claim 1 wherein the routing policy includes a plurality of policy statements, each policy statement having one or more differing values associated with one or more customers or customer classes, and
    wherein parameterizing includes assigning parameters to the one or more differing values of the policy statements.

5. The method of claim 1 wherein parameterizing includes:
    storing the parameter sets in a parameter table, the table associating each set of parameters with either a customer or a customer class.

6. The method of claim 5 wherein parameterizing includes reusing the common blocks in the parameterized routing policy.

7. The method of claim 6 wherein parameterizing includes reusing the common blocks in another parameterized routing policy.

8. The method of claim 6 wherein reusing the common blocks includes calling a parameterized policy with parameters from the parameter table based on one of either the customer or the customer class.

9. The method of claim 5 wherein applying includes determining at least one of whether to accept the route, whether to modify attributes of the route, or whether to send the route or the modified route to peer routing systems.

10. The method of claim 9 wherein when the route is accepted or modified, applying includes installing the accepted or the modified route.

11. The method of claim 9 including modifying attributes of the route, wherein modifying includes at least one of changing an attribute, creating a new attribute, or deleting an attribute of the route.

12. The method of claim 1 including:
    identifying one or more common blocks of policy statements, the common blocks being common to more than one routing policy;
    generating a commonized routing policy from the one or more common blocks; and
    reusing the commonized routing policy by calling the commonized routing policy from within the more than one routing policy which uses the common blocks.

13. The method of claim 12 wherein parameterizing includes assigning parameters to at least some of the policy statements of the common blocks to parameterize at least some policy statements in the common blocks.

14. A routing apparatus comprising:
    a processor to parameterize a routing policy, wherein the parameterizing includes identifying one or more common blocks of policy statements within the routing policy, at least one policy statement in the common blocks of policy statements being an attribute-operator pairing, wherein the operator is a set operator for setting the attribute to a particular value, the common blocks of policy statements sharing a similar structure, assigning sets of parameters to elements of the one or more common blocks, at least one common block being re-used with a different assigned set of parameters, and enabling a hierarchical arrangement of the one or more common blocks of policy statements within the routing policy, the processor to compile the parameterized routing policy and to apply the parameterized routing policy to a received route; and
    a storage element to store parameters associated with the parameterized routing policy.

15. The apparatus of claim 14 wherein the routing policy includes a plurality of policy statements, and wherein the processor is to assign parameters to at least some of the policy statements and is to refrain from assigning parameters to at least some other of the policy statements to generate the parameterized routing policy, and wherein the processor is to store the assigned parameters in the storage element.

16. The apparatus of claim 14 wherein the processor is to generate at least one parameterized-policy statement having an associated set of parameters for one of either a customer or a customer class.

17. The apparatus of claim 14 wherein the routing policy includes a plurality of policy statements, each policy statement having one or more differing values associated with one or more customers or customer classes, and wherein the processor is to assign parameters to the one or more differing values of the policy statements.

18. The apparatus of claim 14 wherein the processor is to store the parameter sets in a parameter table of the storage element, the table associating each set of parameters with either a customer or a customer class.

19. The apparatus of claim 18 wherein the processor is to reuse the common blocks in the parameterized routing policy.

20. The apparatus of claim 19 wherein the processor is to reuse the common blocks in another parameterized routing policy.

21. The apparatus of claim 19 wherein the processor, as part of reusing, is to call a parameterized policy with parameters from the parameter table based on one of either the customer or the customer class.

22. The apparatus of claim 18 wherein the processor is to determine at least one of whether to accept the route, whether to modify attributes of the route, or whether to send the route or the modified route to peer routing systems.

23. The apparatus of claim 22 wherein when the route is accepted or modified, the processor is to install the accepted or the modified route on a router.

24. The apparatus of claim 22 wherein the processor is to modify attributes of the route by at least one of changing an attribute, creating a new attribute, or deleting an attribute of the route.

25. The apparatus of claim 14 wherein the processor is to:
identify one or more common blocks of policy statements, the common blocks being common to more than one routing policy;
generate a commonized routing policy from the one or more common blocks; and
reuse the commonized routing policy by calling the commonized routing policy from within the more than one routing policy which uses the common blocks.

26. The apparatus of claim 25 wherein the processor is to assign parameters to at least some of the policy statements of the common blocks to parameterize the at least some policy statements in the common blocks.

27. A non-transitory machine-readable storage medium that provides instructions, which when executed by one or more processors, cause said processors to perform operations comprising:
parameterizing a routing policy, wherein the parameterizing includes identifying one or more common blocks of policy statements within the routing policy, at least one policy statement in the common blocks of policy statements being an attribute-operator pairing, wherein the operator is a set operator for setting the attribute to a particular value, the common blocks of policy statements sharing a similar structure, assigning sets of parameters to elements of the one or more common blocks, at least one common block being re-used with a different assigned set of parameters, and enabling a hierarchical arrangement of the one or more common blocks of policy statements within the routing policy;
compiling the parameterized routing policy; and
applying the parameterized routing policy to a route.

28. The machine-readable storage medium of claim 27 wherein the instructions, when executed by one or more of said processors cause said processors to perform operations, wherein the routing policy includes a plurality of policy statements, and wherein parameterizing includes assigning parameters to at least some of the policy statements and refraining from assigning parameters to at least some other of the policy statements to generate the parameterized routing policy.

29. The machine-readable storage medium of claim 27 wherein the instructions, when executed by one or more of said processors cause said processors to perform operations, wherein parameterizing includes: for the routing policy, generating at least one parameterized-policy statement having an associated set of parameters for one of either a customer or a customer class.

30. The machine-readable storage medium of claim 27 wherein the instructions, when executed by one or more of said processors cause said processors to perform operations wherein the routing policy includes a plurality of policy statements, each policy statement having one or more differing values associated with one or more customers or customer classes.

31. The machine-readable storage medium of claim 30 wherein the instructions, when executed by one or more of said processors cause said processors to perform operations wherein parameterizing includes assigning parameters to the one or more differing values of the policy statements.

32. The machine-readable storage medium of claim 27 wherein the instructions, when further executed by one or more of said processors cause said processors to perform operations including:
storing the parameter sets in a parameter table, the table associating each set of parameters with either a customer or a customer class.

33. The machine-readable storage medium of claim 32 wherein the instructions, when executed by one or more of said processors cause said processors to perform operations including reusing the common blocks in the parameterized routing policy.

34. The machine-readable storage medium of claim 32 wherein the instructions, when executed by one or more of said processors cause said processors to perform operations including reusing the common blocks in another parameterized routing policy.

35. The machine-readable storage medium of claim 33 wherein the instructions, when executed by one or more of said processors cause said processors to perform operations including reusing the common blocks comprises calling a parameterized policy with parameters from the parameter table based on one of either the customer or the customer class.

36. The machine-readable storage medium of claim 32 wherein the instructions, when executed by one or more of said processors cause said processors to perform operations including applying further comprises determining at least one of whether to accept the route, whether to modify attributes of the route, or whether to send the route or the modified route to peer routing systems.

37. The machine-readable storage medium of claim 27 wherein the instructions, when executed by one or more of said processors cause said processors to perform operations including:
 identifying one or more common blocks of policy statements, the common blocks being common to more than one routing policy;
 generating a commonized routing policy from the one or more common blocks; and
 reusing the commonized routing policy by calling the commonized routing policy from within the more than one routing policy which uses the common blocks.

* * * * *